(12) United States Patent
Leistner

(10) Patent No.: US 6,305,888 B1
(45) Date of Patent: Oct. 23, 2001

(54) T-NUT WITH INDENTED LEADING AND TRAILING EDGE FLANGES

(75) Inventor: Herbert E. Leistner, deceased, late of Toronto (CA), by Martin Leistner, Lloyd Weiss, legal representatives

(73) Assignee: Sigma Tool & Machine (CA)

( * ) Notice: Subject to any disclaimer, the term of this patent is extended or adjusted under 35 U.S.C. 154(b) by 0 days.

(21) Appl. No.: 09/588,355

(22) Filed: Jun. 7, 2000

(30) Foreign Application Priority Data

Oct. 6, 1999 (CA) ................................................. 2273819

(51) Int. Cl.⁷ ............................ F16B 37/00; F16B 37/04
(52) U.S. Cl. ............................ 411/177; 411/183; 411/427
(58) Field of Search .................................. 411/173, 177, 411/181, 183, 427

(56) References Cited

U.S. PATENT DOCUMENTS

| 5,348,432 | * | 9/1994 | Nagayama ..................... 411/177 X |
| 5,863,164 | * | 1/1999 | Leistner ........................ 411/177 X |
| 6,129,493 | * | 10/2000 | Leistner et al. .................. 411/183 |
| 6,183,181 | * | 2/2001 | Leistner et al. .................. 411/177 |

* cited by examiner

*Primary Examiner*—Neill Wilson
(74) *Attorney, Agent, or Firm*—H. Jay Spiegel

(57) ABSTRACT

A T-Nut having a generally tubular barrel with an interior female thread and a flange with prongs bent to embed in a work piece, and in which the flange has planar sides to ride in a feed guide, and has end edges on the flange, at the leading and trailing edges of the flange, which end edges can contact respective end edges on leading and trailing T-Nuts within the feed, a generally median U-shaped depression formed in each of the leading and trailing edges and, generally arcuate recesses formed in each of the edge flange, on either side of the U-shaped depression.

5 Claims, 2 Drawing Sheets

T-NUT WITH INDENTED LEADING AND TRAILING EDGE FLANGES

FIELD OF THE INVENTION

The invention relates to T-Nut fasteners of the type having a generally tubular barrel, at least a portion of which is formed with an interior female thread, and having generally planar flanges extending generally normal to the axis of the barrel, at one end, and in particular to such a T-Nut which is formed with scalloped edges along opposite ends of the flanges, to ensure smooth feeding in a fastener feed track.

BACKGROUND OF THE INVENTION

T-Nut fasteners consisting of a tubular barrel and a generally peripheral flange at one end, are well known. They are particularly useful in the furniture industry. In this case they are embedded into a work piece typically an element of a piece of furniture which may be made of wood or composition or in fact thermo-plastic in some cases. When the furniture is assembled, bolts or other threaded fastening devices are inserted into the T-Nuts to hold two components of furniture together. Any one piece of furniture may incorporate a large number of T-Nuts, and it will be readily understood that the use of such T-Nuts is wide-spread and on a very large scale. Such T-Nuts are formed by stamping them out of sheet metal, so that the barrel is extruded from the plane of the sheet, and the flanges are cut out from the sheet, so as to form an integral one piece sheet metal T-Nut. The barrel is usually internally female threaded either along its whole length or along a portion of its length. In some cases the free end of the barrel may be provided without threads so that it can be swaged or flared out to provide as it were a rivet action, holding the T-Nut in the work piece. Such T-Nuts are in a great majority of cases provided with spikes, usually four spikes, which are formed by cutting edges of the flanges, to form a series of pointed spikes or prongs which are then bent usually at right angles to the plane of the flange. These prongs embed in the workpiece and provide further security to hold the T-Nut in position.

All these facts are very well known in the industry and are merely repeated here for the sake of clarity and explanation. Numerous patents show various forms of T-Nuts, some of which are listed at the end of this description.

From this explanation it will be understood that the insertion and securing of the T-Nuts in the work piece must be carried out at high speed and with great accuracy and repeatability. Numerous machines have been developed for this purpose to provide automatic power insertion of T-Nuts into a work piece. Many of these machines also provide the swaging or flaring action to flare the free end of the barrel.

Usually such T-Nuts are packaged loose in large containers. They are dumped from these containers into feed hoppers on the insertion machines. They are delivered usually along a feed slide extending from the hopper to the insertion anvil or hammer which drives the T-Nut into the work piece.

It will be understood that continuity and repeatability of operation in such a machine are absolutely essential to provide smooth flow of production of finished product. If there is any holdup in such a machine it may slow down production for minutes or even hours while the machine is made serviceable once more. This downtime causes loss of production, frustration in employees, and may cause missed delivery dates.

One of the leading causes of problems in such machines is that the edge flanges of the T-Nuts, being stamped out from sheet metal, are formed with minute burrs at various points. These burrs become more aggravated as the stamping dies become worn.

The edges of the flanges are sharp, and in most cases are formed in a linear fashion. In many cases the flanges are octagonal. In other cases, they are simply round.

All such flanges do experience certain problems in achieving a smooth flow of T-Nuts along the feed slide, and stoppages are experienced in a random fashion when using insertion machines with such T-Nuts.

One of the problems in such feed slides is that they are usually formed around a curved path. There must therefore be a certain amount of clearance within the slide, to allow for the planar flange to pass around a curved path. There is often a tendency for the flange of one T-Nut to ride up over the flange of a leading or trailing T-Nut, and this then causes jamming of the T-Nuts in the slide and malfunction of the machine.

One approach to overcoming this problem is shown in U.S. Pat. No. 4,508,478, entitled T-Nut Fastener Member, inventor: Herbert E. Leistner, Toronto, Canada, granted Apr. 2, 1985.

In this T-Nut, the leading and trailing flange edges are formed with a generally U-shaped depression. The U-shaped depressions of adjacent T-Nuts function to prevent the over-riding of the flange of one T-Nut with the next, in the slide.

While this improved T-Nut greatly reduces the problem, it has been found desirable to provide still further enhancements. This will be of significance where the T-Nuts are going around a track which exhibits a compound curve. In these cases the T-Nuts may have a tendency to twist slightly from side to side. As a result of this twisting one T-Nut flange may still on occasion jam with the next T-Nut flange. While this occurrence is relatively rare, it will be appreciated from the above explanation that any malfunction of the insertion machine is undesirable.

BRIEF SUMMARY OF THE INVENTION

With a view therefore to providing a T-Nut with still greater resistance to slide jamming, the invention comprises a T-Nut of the type having a generally tubular barrel with an interior female thread along at least a portion of the barrel, and a flange at one end of the barrel extending substantially normal, prongs formed integrally with the flange, and bent at an angle thereto to embed in a work piece, and wherein the flange is formed with planar side portions adapted to ride in a feed slide mechanism, and having substantially linear side edges parallel to one another in spaced apart relation, to guide the T-Nut along the slide mechanism, and having end edges on the flange, at the leading and trailing edges of the flange, which end edges are adapted to abut with respective end edges on leading and trailing T-Nuts within the feed slide mechanism, a generally median U-shaped depression formed in each of said leading and trailing edges of said flange, and, generally arcuate recesses formed in each of said edge flanges, on either side of said U-shaped depression, whereby to provide a generally scalloped edge, along each of said leading and trailing edges of said flange.

The invention further provides such a T-Nut wherein the barrel comprises a first female threaded portion, extending from said flange, and a second flarable portion, having an outer diameter greater than the outer diameter of said first threaded portion, extending from said first threaded portion to the free end of said barrel.

The invention further provides that at the free end of said flarable portion, a generally radius in-turned mouth is formed, to facilitate insertion into a work piece.

The invention further provides that the edge flange is formed with integral prongs, extending alongside the tubular barrel, and in which the prongs are formed with generally saw tooth like serrations.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
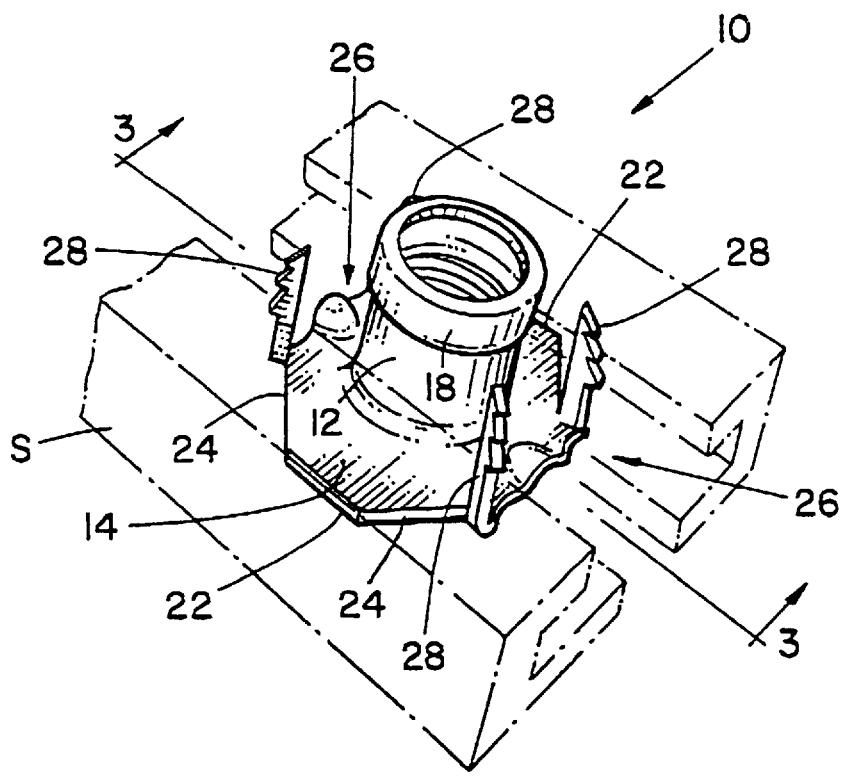
FIG. 1 is a perspective illustration of a T-Nut, illustrating the invention.
Figure 3:
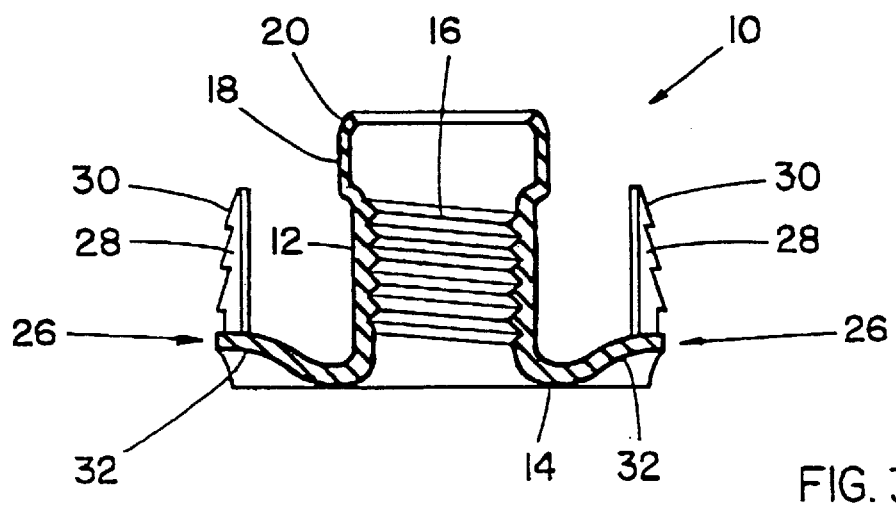
FIG. 3 is a section along the line 3—3 of FIG. 2.
Figure 2:
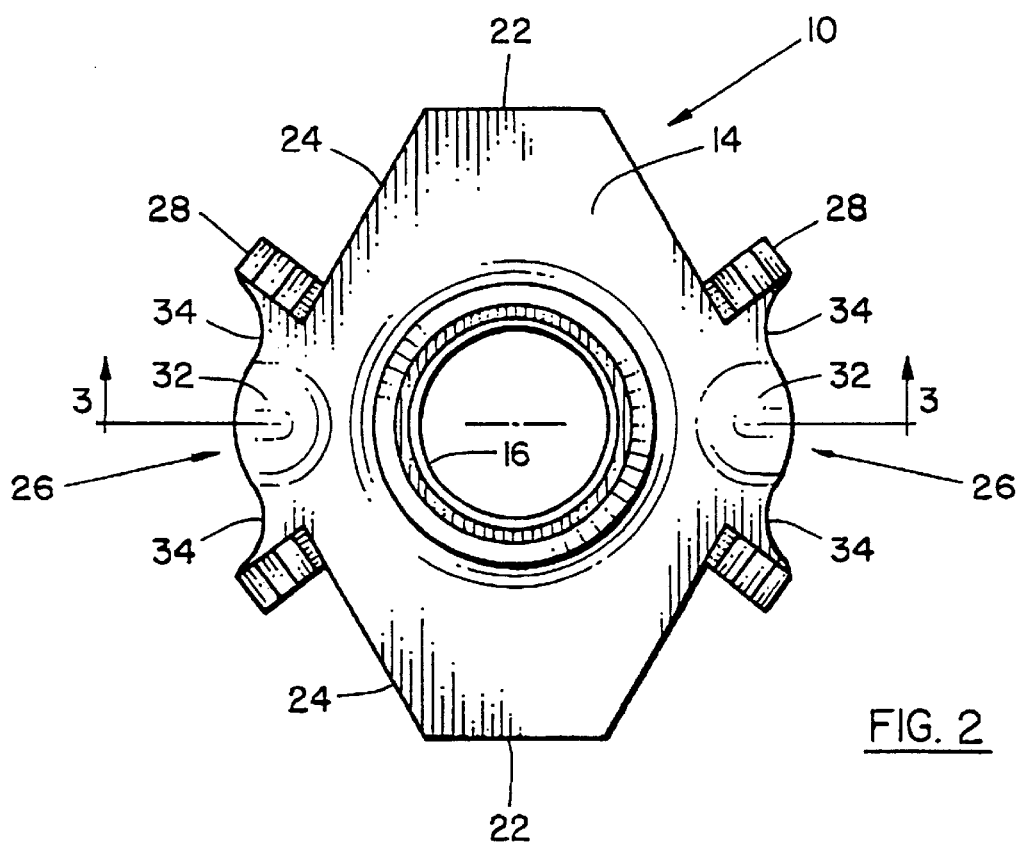
FIG. 2 is a top plan view of the T-Nut of FIG. 1.
Figure 4:
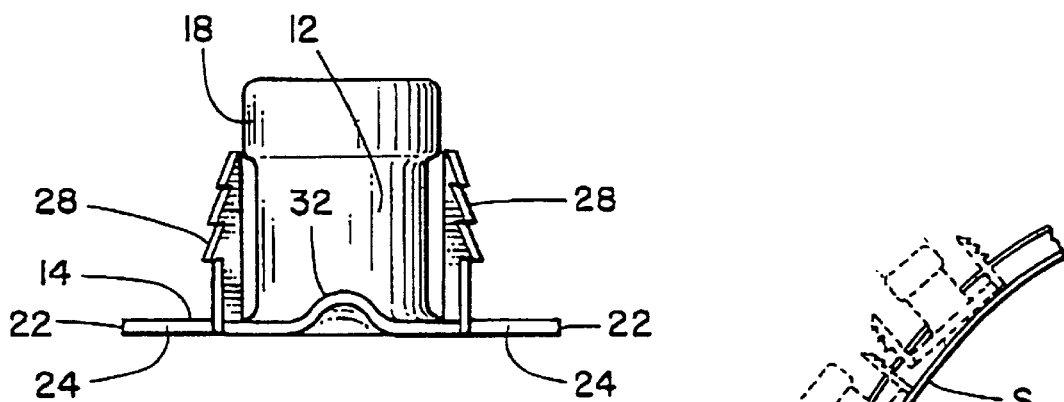
FIG. 4 is a end view of one end of the T-Nut, the other end being identical.
Figure 5:
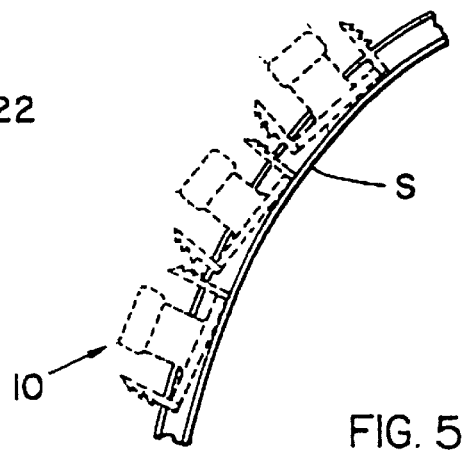
FIG. 5 is a schematic illustration of a T-Nut feed slide, such as is commonly used for feeding T-Nuts to a T-Nut setting machine.

Referring first of all to FIG. 1, it will be seen that this shows a T-Nut illustrated generally as 10. T-Nuts of this general description are well known in the furniture industry particularly, although not exclusively, and are usually used by embedding the T-Nut in a work piece commonly of wood, though in many cases of other materials as well. Usually, the work piece will have a hole predrilled completely through, piercing the work piece from one side to the other. A T-Nut is then inserted forcibly into the hole. The T-Nut is then employed when the items are assembled, by passing threaded fasteners such as bolts, screws and the like (not shown) into the T-Nut.

All of this is very well known in general terms and is repeated here merely by way of explanation.

Also as is well known T-Nuts exhibit various characteristics. In the first place, in some types of materials and work pieces they may become loose over time, and the fastening becomes insecure.

The other problem is that such T-Nuts are usually inserted or set into a work piece in a specially designed T-Nut setting machine employing a plunger or hammer, which drives a T-Nut down through a hole in a work piece. The T-Nuts are fed to the driving-in hammer by means of a slide which is connected to a hopper or T-Nut container.

T-Nuts occasionally jam in the slide, and prevent the supply of T-Nuts to the setting station. This results in a stoppage at the workplace, and also produces components which are incomplete and are therefore rejects.

Continuous efforts are made to both improve the T-Nuts security of hold in the work piece and also to improve the ability with which it feeds to the setting station.

In accordance with the present invention, a T-Nut 10 comprises a tubular barrel 12, and a flange 14 at one end of the tubular barrel. The purpose of the flange is to abut against the surface of the work piece, and to hold the T-Nut in position against the pull of a threaded fastener (not shown).

In the particular embodiment shown, the barrel 12 is provided with a first female threaded portion 16 having a predetermined diameter d and a second flaring portion barrel portion 18 having a diameter D. The flaring portion is typically formed by swaging or otherwise enlarging the tubular barrel, although various other machining processes have been used for the purpose. The enlarging of the flarable portion 18 is usually carried out in the manufacturing process, before the threading of the threaded portion 16. In this way the enlarged portion 18 of the barrel allows the insertion of a typical threading tool (not shown) into the interior of the barrel 12 which can then thread the interior of the threaded portion 16.

In the particular embodiment illustrated, the free end of the flarable portion 18 is formed with an in-turned radiused mouth 20. The purpose of this is to facilitate the driving in of the T-Nut into a predrilled hole in a work piece, and as far as possible, to eliminate or at least reduce the accumulation of for example, sawdust or flakes of material from the work piece which would otherwise collect in the barrel.

The flange 14 is formed integrally with the barrel 12, typically by stamping the T-Nut out of a piece of sheet metal, the barrel 12 being extruded from the sheet metal in the stamping process.

In this particular embodiment the flange 14 is of octagonal shape. The shape defines two parallel side edges 22—22, which are linear, and four angled edges 24.

Leading and trailing end edges 26—26 are also defined, to form eight edges in all. Four prongs 28 are formed by being struck out of sheet metal and are bent downwardly alongside the tubular barrel 12 but spaced therefrom.

The prongs 28 are of the elongated right angular triangular shape, when viewed in elevation, with the inside edges of the prongs being substantially parallel with the axis of the barrel 12.

A plurality of generally saw tooth shaped serrations 30 are formed along the outwardly facing angled edges on the prongs 28. These assist in providing a secure grip in a work piece around a predrilled opening (not shown). The inwardly facing edges of the prongs are smooth.

When viewed in end elevation, each of the end edges 26 will be seen to be formed with a median generally U-shaped depression 32. When viewed in plan, the end edges 26 will be seen to be formed with scallop-shaped formations comprising generally arcuate recesses 34. The arcuate recesses 34 are formed on either side of the U-shaped depression 32.

In this way, the end edges 26 define both the U-shaped depressions 32, in elevation, and also generally scallop-shaped formations 34 when viewed in plan.

When such T-Nuts are placed in a typical feed slide S, the side edges 22 and 22 of the flange 14 ride in grooves in the slide S. The end edges 26 of the flanges of adjacent T-Nuts abut one another. As the T-Nuts pass around compound curves in the slide, the end edges will move relative to one another. The U-shaped depressions 32 assist in preventing the end edges from overriding one another, when they are in end abutting relation. The scallop-shaped recesses 34 prevent the end edges overriding one another, when the T-Nuts are passing around a compound curve.

The foregoing is a description of a preferred embodiment of the invention which is given here by way of example only. The invention is not to be taken as limited to any of the specific features as described, but comprehends all such variations thereof as come within the scope of the appended claims.

The embodiments of the invention in which an exclusive property or privilege is claimed are defined as follows:

1. A T-Nut of the type having a generally tubular barrel with an interior female thread along at least a portion of the barrel, and a flange at one end of the barrel extending substantially normal, prongs formed integrally with the flange, and bent at an angle thereto to embed in a work piece for use in a T-Nut insertion machine having a feed means, and comprising;

- planar side portions on the flange adapted to ride in a feed means, and having substantially linear side edges parallel to one another in spaced apart relation, to guide the T-Nut along the feed means;
- end edges on the flange, at the leading and trailing edges of the flange which end edges are adapted to abut with respective end edges on leading and trailing T-Nuts in the feed means;
- generally median U-shaped depression formed in each of said leading and trailing edges of said flange; and,
- generally arcuate recesses formed in each of said end edge flanges, on either side of said U-shaped depression, whereby to provide a generally scalloped end edge, along each of said leading and trailing end edges of said flange.

2. A T-Nut as claimed in claim 1 wherein the barrel comprises a first female threaded portion, extending from said flange, and a second flarable portion, having an outer diameter greater than the outer diameter of said first threaded portion, extending from said first threaded portion to the free end of said barrel.

3. A T-Nut as claimed in claim 1 wherein at the free end of said flarable portion, a generally radiused in-turned mouth is formed, to facilitate insertion into a work piece.

4. A T-Nut as claimed in claim 1 wherein the edge flange is formed with integral prongs, extending alongside the tubular barrel, and in which the prongs are formed with generally saw tooth like serrations, along outwardly facing edges, the inwardly facing edges being smooth.

5. A T-Nut as claimed in claim 4 wherein each prong is of rightangular triangular shape in elevation, and wherein the base of the triangle lies in a plane parallel to the plane of the flange and wherein the rectangular side edge of the triangle is substantially parallel to the central axis of the sleeve of the T-Nut, and wherein the outwardly facing edges of the prongs are angled at an acute angle to the rectangular side edge.

* * * * *